United States Patent Office.

ALBERT VERLEY, OF COURBEVOIE, FRANCE, ASSIGNOR TO THE SOCIÉTÉ ANGLO-FRANCAISE DES PARFUMS PERFECTIONNES, LIMITED, OF LONDON, ENGLAND.

PROCESS OF DEFECATING SUGAR-JUICES.

SPECIFICATION forming part of Letters Patent No. 637,363, dated November 21, 1899.

Application filed July 1, 1898. Serial No. 684,979. (No specimens.)

*To all whom it may concern:*

Be it known that I, ALBERT VERLEY, electrician, a citizen of the French Republic, and a resident of 7 Quai de Seine, Courbevoie, near Paris, France, have invented new and useful Improvements in the Manufacture of Sugar, (for which applications for patents have been made in Great Britain, No. 1,131, January 14, 1898; in Spain March 23, 1898; in Germany March 14, 1898; in Belgium February 8, 1898; in Russia, January 22, 1898, R. S.; in Austria March 16, 1898; in Hungary March 8, 1898, and in India,) of which the following is a specification.

This invention consists in an improved mode of effecting the purification of the juice of beet-root or sugar-cane or other vegetable juices containing sugar, by means of which it is possible in a more convenient and expeditious manner to decolorize the juice and to remove from it organic impurities and odor. It is a development of the invention for which I applied for Letters Patent, Serial No. 653,810, filed October 2, 1897, and renders the process of purifying sugar-containing juices by means of ozone, to which such application for Letters Patent relates, more convenient and better suited for industrial use. The process according to the present invention is applicable to such juice at any stage of its manufacture before it is decolorized, and even to molasses and like fluids when sufficiently diluted to permit of its use; but for convenience sake I will describe it as applied to the juice of beet-root prepared in the ordinary way for the manufacture of sugar. The juice is taken after it has been rendered slightly alkaline, either by the addition of an alkali or an alkaline earth or by the ordinary treatment with lime and carbonic acid. The degree of alkalinity which is preferred is about 0.2 gram per liter. It is then by preference filtered and cooled to about 20° centigrade. Ozone or ozonized air is then caused to bubble through the juice. For commercial purposes there should be active agitation during the process of ozonization, even to the point of producing a temporary mixture, in order to quicken the action of the ozone and to render it more regular and complete. The ozone at first passes rapidly into combination with the organic matter; but after a while this action becomes less energetic and but little ozone is absorbed. For this reason the ozone or ozonized air should be made to pass in succession through several vessels containing juice, which are in turn cut off from its action when the ozonization is complete, emptied, and refilled with other juice to be treated. The ozone or ozonized air enters by the vessel of the series that contains the juice that has been least exposed to the action of the ozone and leaves by the one that has been longest exposed to that action. In this way the process can be worked as a continuous process and the juice in each vessel receives an equal treatment with ozone. When the ozone is first applied, the color of the juice usually appears to become somewhat deeper; but this subsequently passes away, and the termination of the process of ozonization is marked by its becoming colorless. For the purpose of this process of ozonization the use of iron vats is preferred, which may, if desired, be lined with lead. If wooden vats are used, it is found that the ozone attacks the wood and forms coloring-matter, which prevents the decolorization from taking place. Where ozonized air is used, all traces of acid which may be formed during the production of the ozone should be removed either by passing it through lime-water or otherwise. To complete the process of purification, the juice has now to be treated with a reducing agent and the organic matters which exist as impurities have to be removed. This is effected in the following way: An active reducing agent is taken, such as the zinc-copper couple of Gladstone and Tribe, and is added to the juice, which for this purpose is heated to, say, 80° centigrade. By this means the organic matters are reduced and at the same time precipitated along with the reducing agent, or the aluminium amalgam of Wislicenus, which has the advantage of working in the cold, may be used, or the sulphate of the protoxide of chrome or manganese, in which latter case it is preferable to form these bodies in the presence of the juice itself by adding thereto the sulphate of the sesqui-oxide and a reducing metal. In all cases where solid reducing agents are used agitation is essential, or, as an equivalent for the purposes of this process of the steps just described, electrolysis applied directly to the juice may be used to effect the reduction, the cathode being an oxidizable metal.

In the specification of my aforesaid previous application for Letters Patent I proposed the use of sulphurous acid (which is a reducing agent) after the ozonization. It has now been found that its suitability was solely due to its reducing action and that the like result can be obtained by other reducing agents, as above set forth, which offer advantages in practice over the use of sulphurous acid in the manner described in the said former specification. Sulphurous acid can also be made use of in a more advantageous way, as follows: In working with juice of the alkalinity above mentioned continue the treatment with sulphurous acid till an acidity of about one gram per liter is attained, and then neutralize with an alkaline earth, preferably baryta, and warm to a temperature of from 50° to 80° centigrade. This brings about a precipitation, which leaves the juice clear and free from organic impurities, or there may be added to the juice while it is being treated with sulphurous acid some zinc powder or other reducing metal, which causes hydrosulphurous acid to be formed, or there may be added to the juice hydrosulphurous acid which has been already formed. In each case add an alkaline earth, preferably baryta, and warm, as before.

The above reducing agents can be used separately or in combination, and in general any reducing agent or agents can be used which are from their other physical properties suitable—i. e., which do not leave in the juice foreign substances not capable of ready elimination.

The reducing agents specially mentioned—viz., zinc-copper couple, aluminium amalgam, sulphate of protoxide of chrome or manganese, and electrolysis—can also be used to advantage in the process of purifying the juice when ozone is not used, as they decolorize and enable a portion of the organic matter to be removed.

In the following claim, where one of the reducing agents is mentioned, it is to be understood as including the other reducing agents hereinbefore specified, all of which are equivalents for the purpose indicated.

Having now particularly described and ascertained the nature of this invention and in what manner the same is to be performed, I declare that what I claim is—

The herein-described process of purifying the juice of beet-root or sugar-cane or other solutions of sugar containing organic impurities, consisting in first subjecting the liquid to the action of ozone or ozonized air after it has been rendered alkaline, and then treating the liquid with zinc-copper couple for the purpose of reducing the same, substantially as described.

In testimony whereof I have signed this specification in the presence of two subscribing witnesses.

ALBERT VERLEY.

Witnesses:
MAURICE BAUBEY,
A. MEMOR.